Patented Jan. 6, 1931

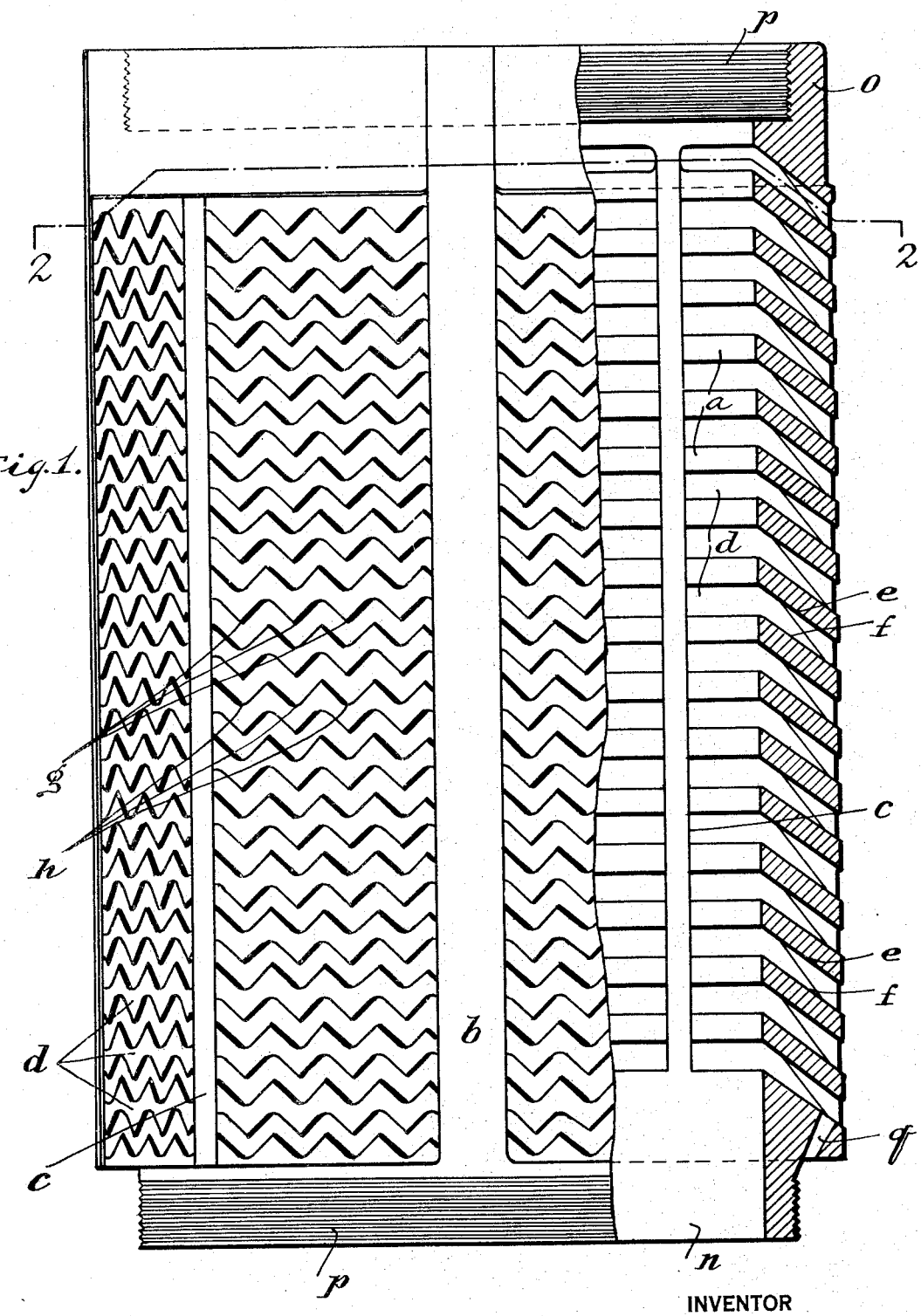

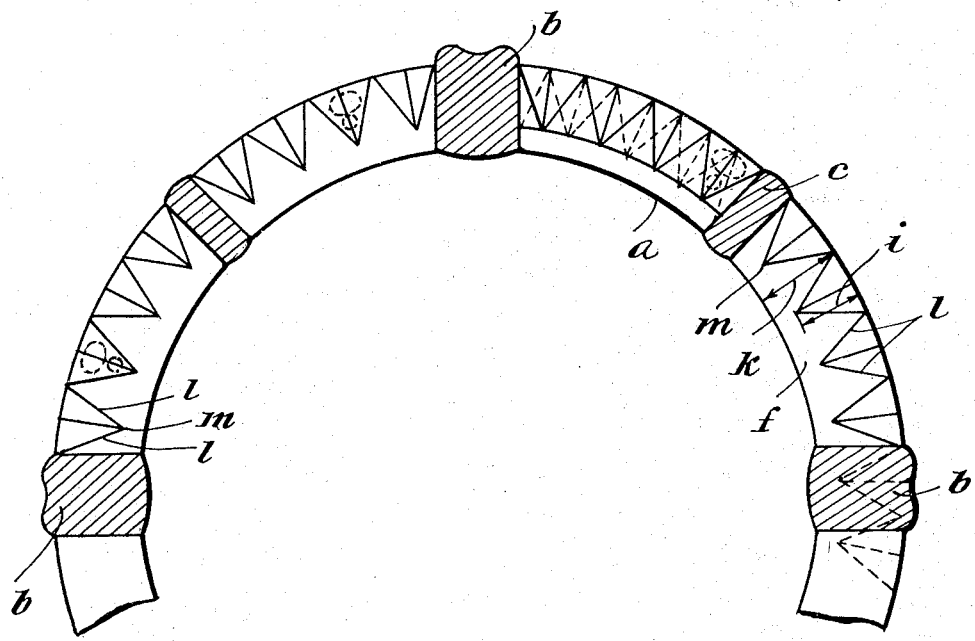
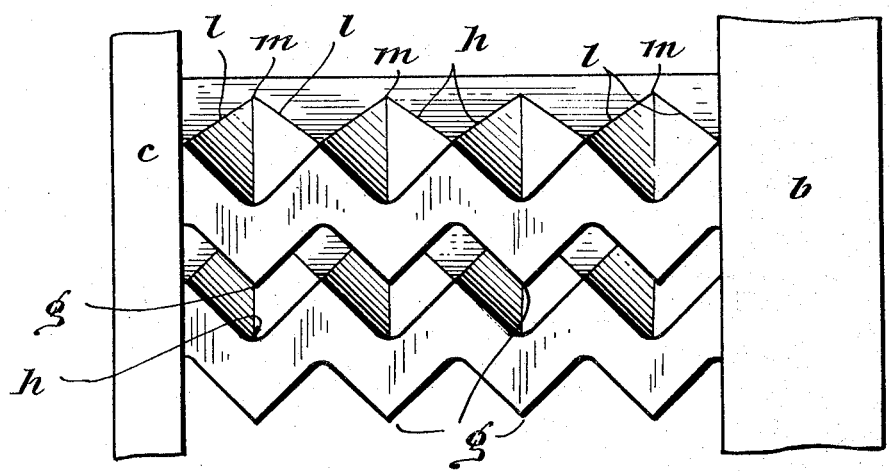

1,787,634

UNITED STATES PATENT OFFICE

OTTO LAUBNER, OF PENZIG, GERMANY

FILTER UNIT FOR TUBE WELLS

Application filed April 6, 1929, Serial No. 353,002, and in Germany January 30, 1929.

The invention relates to a filter tube or to a filter unit for tube wells, that is as well a filter tube having the water inlet openings in its wall roofed, as also a filter tube with inlet ducts rising obliquely, which extend over the larger part of the tube circumference. Special reference is had to filter units consisting of bell or ring shaped elements. In the finished wells these filter tubes are surrounded by a gravel layer, the size of grain of which becomes smaller with increasing distance from the filter.

Hitherto the makers of tube well filters have used tubes of acid-proof ceramic material with plain surfaces inside and outside and provided with apertures. Such tubes were easily manufactured in one piece as ordinary clay pipes; they suffered, however, from the drawback that the gravel or sand surrounding the tubes for better purification of the water were able to enter directly into the horizontally positioned apertures. It became necessary, therefore, to line the tubes with strainers of fabrics, which would soon become choked and crusted through the deposition of iron-ochre.

The filters used instead, viz., the so-called lamination or bell type filters with obliquely rising water inlet ducts, have so far been built together of ring-shaped sections made singly. These rings were placed one on the other and connected one to the other by means of separate elements, such as metal bolts or putty. The breaking strength of these filters is very low, so that they were often either broken in transport or on the building site, or were fractured after installation through the excessive pressure of the earth material.

It has been shown, that this drawback may be removed in a simple manner in this way, that a filter unit of this type with obliquely rising or roofed inlet ducts is made in one integral piece by casting. The materials to be considered are, besides acid roof ceramic material, such as e. g. glazed clay, also metal or glass.

In order to increase the safety against gravel entering into the water inlet ducts, it will be within the meaning and compass of the invention to make the inlet ducts uneven so that the uneven parts or projections of the one wall of the duct will project inbetween the intervals between two uneven parts or projections of the opposite wall.

In the preferred modification the walls of the inlet ducts are shaped zig-zag or corrugated, and the length of these corrugations or undulations should be equal to or less than the radial length of the said ducts.

In the drawing a preferred modification of the invention has been illustrated by way of example.

Fig. 1 is a view of the entire filter unit with part of the right-hand side shown in a longitudinal section.

Fig. 2 is a plan view of the filter unit in cross-section along line II—II of Fig. 1.

Fig. 3 is an outside view of a part of the filter unit on an exaggerated scale.

The filter unit consists of several annular sections $a$, which are superimposed one upon the other and are held together by longitudinal stays $b$ and $c$. This entire body is cast in one integral piece and consists of an acid-proof ceramic material such as e. g. glazed clay or porcelain; it may be made, however, also from metal or glass by casting.

The longitudinal stays $b$ and $c$ are of equal or different cross-sectional area and may project towards the inside of/and outside over the rim of the rings or bells $a$. Between the rings $a$ the water inlet ducts rise obliquely at any gradient (from the outside towards the inside), said water inlet ducts $d$ having on their walls $e$ and $f$ projections as aforesaid. These are preferably so made that the walls $e$ and $f$ are formed zigzag or wave-like. The arrangement is such that the projections of rising waves or undulations $g$ of the one wall $e$ or $f$ enter into the wave valleys or intervals $h$ of the opposite wall of the duct. The radial length $i$ of the folds is less than the radial length $k$ of the water inlet ducts $f$. The starting lines $l$ of each fold meet at point $m$.

In case the filter unit is made by casting in one integral piece, the folds should extend over the entire radial length of the water inlet ducts, as otherwise the formed parts cannot be drawn out after casting. The depth of the folds may also decrease from the outside towards the inside.

Owing to this arrangement and design of the rings $a$, the gravel particles are effectually prevented from entering the interior of the filter, without reducing the cross-sectional area as compared to a filter of same size with plane duct walls.

For connecting several filter units to form a tube of some length, each filter unit is provided with sleeves $n$ and $o$. The sleeve $n$ of each filter unit may be threaded outside so that the sleeve $o$, threaded inside, may be screwed on to the filter unit beneath it. In the drawing another modification of connecting two filter units is disclosed. The sleeves $n$ and $o$ are provided with grooves $p$ of any shape; the outside diameter of sleeve $n$, however, is smaller than the inside diameter of sleeve $o$. When putting together two filter rings an interstice is left, which is filled by casting a material through the apertures $q$, said material turning solid. Hereby the two filter rings are held together.

It is also possible to connect the sleeves of two filter units by means of screws passing through or by any other fastening devices.

The form and number of the ring-shaped elements of the filter unit is of no particular importance in carrying out the invention. It is even possible to turn to advantage the corrugation of the walls in the inlet ducts even with filter units which have not been made in one integral piece by casting or otherwise formed in one piece, and then burned. A filter unit with uneven or folded duct walls may also be made as has been usual up to the present, by forming and burning singly the bells or rings $a$, and placing them one upon the other and fixing them one to the other by means of special fastening devices, such as metal bolts or putty. The preferred method, however, is to place the ready formed rings or bells one on the other before burning, so that the supporting faces will sinter together in burning with the result, that a one-piece filter unit is made. In case the rings or bells are made in single pieces and of metal, they may be connected by welding or soldering.

The suggested uneven formation of the walls of the water inlet ducts may also be applied to filter tubes having any number of apertures of any shape, such apertures being roofed by obliquely positioned ribs or lugs arranged at the outside surface of the tube, forming in this further water inlet duct similar to those in the filter ring shown.

Claims:

1. An integrally cast filter unit for tube well filters, provided with obliquely rising water inlet ducts, the walls of said ducts being formed uneven and the projecting parts of one wall being opposite to the rooms intermediate the projecting parts of the other wall.

2. An integrally cast filter unit for well tube filters, provided with obliquely rising water inlet ducts, the walls of the said inlet ducts being folded and the folding mounds of the one face projecting into the folding valleys of the opposite face.

3. An integrally cast filter unit for well tube filters, provided with obliquely rising water inlet ducts, the walls of said inlet ducts being folded, the mounds of the one surface projecting into the valleys of the opposite surface, the depth of the folds becoming smaller from the outside towards the inside.

4. An integrally cast filter unit consisting of glass with obliquely rising water inlet ducts for tube well filters.

5. A filter unit for well tube filters, provided with obliquely rising water inlet ducts, the walls of said ducts being formed uneven and the projections of the one wall lying opposite the spaces between the projections of the other wall.

6. A filter unit for tube well filters, provided with obliquely rising water inlet ducts, the walls of said ducts being formed with folds and the mounds of the one surface projecting into the valleys of the opposite surface.

7. A filter unit for well tube filters in which the walls of the water inlet ducts provided in the filter unit are folded, the mounds of the one surface projecting into the valleys of the opposite surface, the radial length of the folds being less than the radial length of the inlet ducts.

8. A ring-shaped element for making filter-units for well tube filters, the walls of said element forming walls of the water inlet ducts of the filter-units being folded.

In testimony whereof I affix my signature.

OTTO LAUBNER